INVENTOR.
WILLIAM E. WOOLLENWEBER, JR.

July 2, 1968   W. E. WOOLLENWEBER, JR   3,390,926
COMBINED JOURNAL AND THRUST BEARING
Filed Aug. 24, 1966   2 Sheets-Sheet 2

INVENTOR.
WILLIAM E. WOOLLENEBER, JR.

BY Woodard, Weikart, Emhardt & Naughton
Attorneys

# United States Patent Office 3,390,926
Patented July 2, 1968

3,390,926
COMBINED JOURNAL AND THRUST BEARING
William E. Woollenweber, Jr., Columbus, Ind., assignor to Wallace-Murray Corporation, New York, N.Y., a corporation of Delaware
Filed Aug. 24, 1966, Ser. No. 574,620
2 Claims. (Cl. 308—122)

This invention relates generally to bearing systems for high speed rotating machines and in particular to a combination journal and thrust bearing for a turbocharger shaft.

Combined journal and thrust bearings for turbocharger shafts are not unknown in the prior art, one such structure being disclosed in U.S. Patent to MacInnes et al. 3,043,636. The bearing structure of the present invention differs from these prior art structures in that proper oil circulation about the bearing does not require any small oil-flow passages in any of the stationary parts and hence is not subject to clogging of these passages. Further, in the present construction, the bearing sleeve rotates with the turbocharger shaft but at a speed less than that of the shaft, the slowing of the bearing sleeve being accomplished by the drag force created by lubricant pressure on the bearing sleeve as described in U.S. Patent to Woollenweber et al. 3,096,126.

In the prior art structures where one thrust bearing surface rotates directly with, and at the same speed as, the turbocharger shaft, and the other thrust surface is stationary, relative speed between the two surfaces is at a maximum and, consequently, frictional and heat losses are maximum. The use of the end surface of the rotating bearing sleeve as one thrust bearing surface (opposed by a stationary thrust plate) provides thrust surfaces which move at reduced relative surface speed (the bearing sleeve rotating at a speed substantially less than shaft speed) with, therefore, reduced friction or heat losses.

It is the primary object of the present invention to provide a bearing system for high speed rotating machines which exhibits improved stability, lower energy losses compared to prior art structures and which is non-clogging.

A further object of the present invention is to provide a single rotating sleeve bearing for a turbocharger shaft arranged to carry thrust as well as radial loads.

These and other objects will become apparent as the description proceeds with reference to the accompanying drawings in which.

Figure 1:
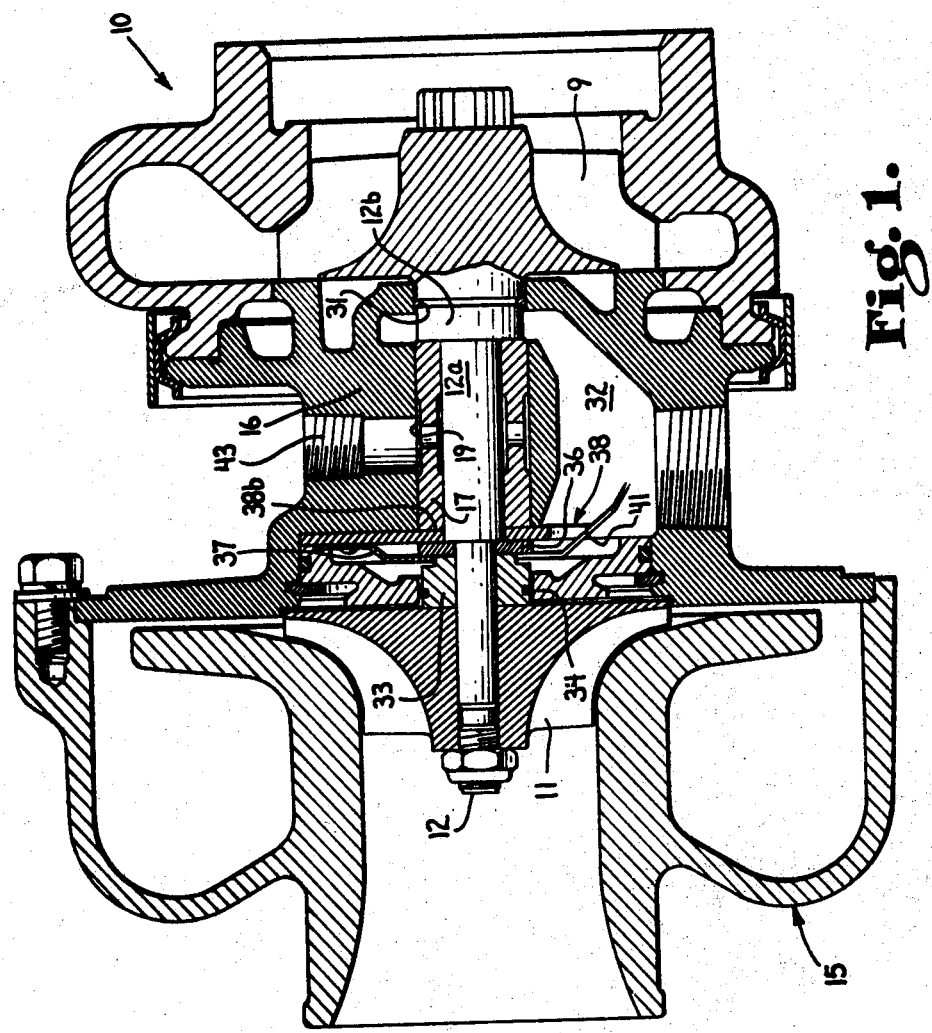
FIG. 1 is a longitudinal cross-section of a turbine driven, high speed, centrifugal air compressor for a turbocharger incorporating the bearing structure of the present invention.

Referring initially to FIG. 1, the bearing structure of the present invention is shown incorporated into a turbine driven, high speed, centrifugal air compressor or turbocharger, however, it will be understood that the bearing structure might be applied to other forms of high speed machinery. In the structure of FIG. 1, the centrifugal air compressor wheel 11 is driven by a radial inflow turbine wheel 9 mounted on the common shaft 12. The turbine wheel 9 cooperates with a housing and nozzle generally indicated at 10, the structure having passages designed so that wheel 9 may provide power to drive the compressor wheel 11. The compressor wheel cooperates with a housing, generally indicated at 15, having chambers designed so that rotation of the wheel 11 provides a compressed air output.

Figure 4:
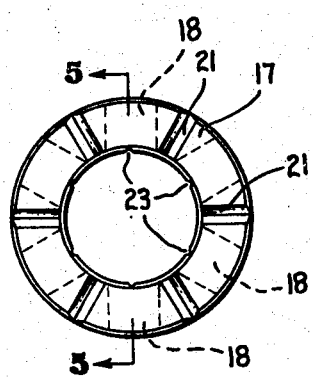
FIG. 4 is an end view of the tubular bearing member shown in FIG. 1.
Figure 5:
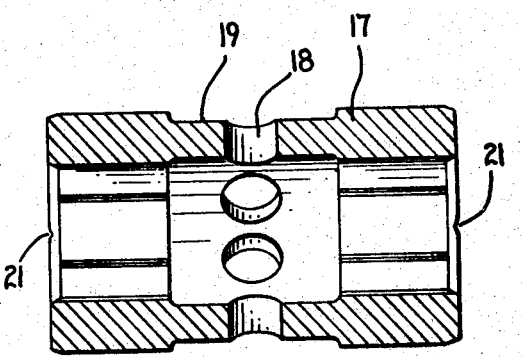
FIG. 5 is a sectional view of the tubular bearing taken generally along the line 5—5 of FIG. 4.

An intermediate casting provides a housing 16 through which an enlarged portion 12a of the shaft extends. Encircling the shaft portion 12a within the housing is a full sleeve tubular bearing 17. The bearing 17 is preferably formed of conventional bearing material and is shown in detail in FIGS. 4 and 5. As may best be seen in FIGS. 4 and 5, the tubular bearing 17 is provided with a series of radial apertures 18 which are placed within a central depression 19 encircling the sleeve. As may best be seen in FIG. 4, the tubular bearing 17 has substantial wall thickness and the end faces of the bearing are provided with generally radial grooves 21 which extend to the inner face of the tubular bearing. The inner surface of the tubular bearing is provided with longitudinally extending grooves 23 (FIG. 4). The apertures 18, and the grooves 21 and 23 form lubricating oil passages insuring an oil film between the surfaces of the shaft portion 12a, the tubular bearing 17 and the enclosing housing 16. The housing 16 is further provided with a lubricating oil passage which extends into communication with the central, depressed portion 19 of the tubular bearing 17 and provides a means for introducing lubricating oil under pressure into the bearing.

An enlarged portion 12b of the shaft 12 accommodates a sealing ring 31 which excludes oil and prevents it from migrating into the turbine blade area from the chamber 32, into which oil from the bearing drains. At the compressor end of the shaft 12 a spacer sleeve 33 is locked on the shaft and cooperates with a sealing ring 34 which seals the compressor area from the bearing lubrication area.

Figure 2:
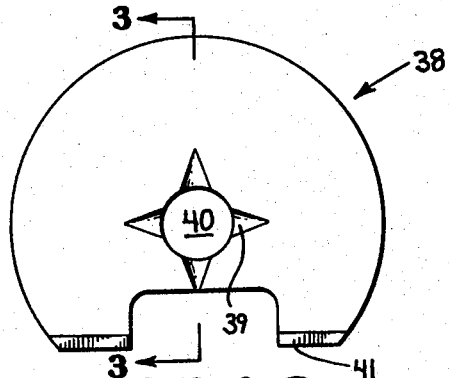
FIG. 2 is an end view of a thrust plate utilized in the bearing structure.
Figure 3:
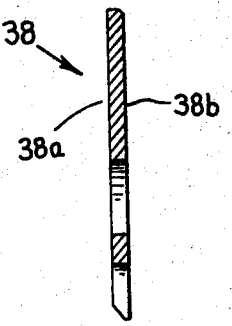
FIG. 3 is a sectional view taken generally along the line 3—3 of FIG. 2.

Secured to the intermediate casting 16 is a thrust plate 38 and secured to the adjacent surface of the thrust plate 38 is an oil deflector plate 37. The plate 38, as may best be seen in FIG. 2, is centrally apertured to accommodate the shaft portion 12a, the aperture being indicated at 39 in FIG. 2. The lower margin of the truncated, circular plate 38 is beveled, as indicated at 41, to engage the adjacent portion of the deflector plate 37. The surface 38b of the thrust plate 38 provides a thrust surface for the opposed end face of the bearing member 16. The outer surface of the thrust plate 38 is grooved as indicated at 39 in FIG. 2 to aid in circulation of lubricating fluid radially along the surface of rotating member 36.

In operation, with a source of lubricating fluid under pressure connected to the passage 43 in the casting 16, and with the shaft 12 rotating at high speed, lubricating fluid will flow along the exterior and interior surfaces of the tubular bearing 17 and across its end face adjacent the surface 38b of the thrust plate 38. The tubular bearing 17 will rotate with the shaft but at reduced speed because of the drag of the lubricating fluid pressure upon it. In a turbocharger such as that disclosed in FIG. 1, having an open backed turbine wheel and a full backed compressor wheel, the primary thrust load is from right to left as viewed in FIG. 1 and the thrust surfaces formed at the end face of the tubular bearing 17 and the adjacent face of the thrust plate 38 provide the thrust surfaces which accommodate the thrust load. Since the tubular bearing 17 rotates at a reduced speed as compared to the speed of the shaft, the relative speed between the end face of the bearing 17 and the adjacent surface of the thrust plate 38 is reduced compared to the relative speed between the shaft and the thrust plate. Thus, if one of the thrust members rotated with the shaft, while the other was stationary, the usual thrust bearing arrangement, the relative speed between the thrust surfaces would be maximum. In the structure of the present invention, since the tubular bearing 17 rotates at a reduced speed as compared to the speed of the shaft, the relative speed of the thrust bearing surfaces is reduced and, consequently, thermal and frictional losses are reduced. It should also be noted that the bearing arrangement of the present invention does not require any relatively small apertures or passages for lubricating fluid in any of the stationary parts, such small lubricant passage in stationary parts being characteristic of prior art structures and being particularly vulnerable to clogging.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. A bearing structure for high speed machinery comprising a journal housing, a shaft having a thrust surface thereon and rotatable within said journal housing, a full sleeve tubular bearing enclosing said shaft within the housing, a relatively large lubricant passage extending through said housing communicating with the space adjacent said tubular bearing and lubricant passages formed in said tubular bearing whereby lubricant fluid may be introduced under pressure between said housing, bearing and shaft to form a lubricant film thereabout permitting said tubular bearing to rotate with said shaft, said tubular bearing rotating at a speed substantially less than the speed of the shaft because of the drag on the tubular bearing caused by lubricant pressure thereon, said tubular bearing having substantial wall thickness so that one end face thereof may act as a thrust bearing surface and a stationary thrust plate extending closely adjacent and parallel to said bearing end face to provide an opposed thrust bearing surface and the other end of the tubular bearing facing the thrust surface on said shaft, said tubular bearing thereby providing both radial and longitudinal bearing support for said shaft with the reduced speed of rotation of said tubular bearing providing a reduced relative speed between said stationary thrust plate and said one end face of the tubular bearing.

2. A bearing structure as claimed in claim 1 wherein the said lubricant passages formed in said tubular bearing include longitudinal grooves in both its inner and outer surfaces, apertures extending radially through its wall and grooves extending across the end faces of the tubular bearing.

References Cited

UNITED STATES PATENTS 3,058,787   10/1962   Bernson _____ 308—121

MARTIN P. SCHWADRON, *Primary Examiner.*

FRANK SUSKO, *Examiner.*